United States Patent
Ingram

(10) Patent No.: US 11,599,391 B2
(45) Date of Patent: Mar. 7, 2023

(54) MEMORY TRANSACTION REQUEST MANAGEMENT FOR AN ORDERED UNIT OF DATA ITEMS

(71) Applicant: Arm Limited, Cambridge (GB)

(72) Inventor: Graeme Leslie Ingram, Cambridge (GB)

(73) Assignee: Arm Limited, Cambridge (GB)

( * ) Notice: Subject to any disclaimer, the term of this patent is extended or adjusted under 35 U.S.C. 154(b) by 178 days.

(21) Appl. No.: 16/592,074

(22) Filed: Oct. 3, 2019

(65) Prior Publication Data

US 2020/0133730 A1 Apr. 30, 2020

(30) Foreign Application Priority Data

Oct. 31, 2018 (GB) ..................................... 1817804

(51) Int. Cl.
*G06F 9/50* (2006.01)
*G06F 9/46* (2006.01)
*G06F 9/54* (2006.01)
*G06F 3/06* (2006.01)
*G06F 13/16* (2006.01)

(52) U.S. Cl.
CPC .......... *G06F 9/5016* (2013.01); *G06F 3/0656* (2013.01); *G06F 9/467* (2013.01); *G06F 9/5038* (2013.01); *G06F 9/544* (2013.01); *G06F 13/1673* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| 5,276,840 | A | 1/1994 | Yu | |
|---|---|---|---|---|
| 6,275,913 | B1* | 8/2001 | Jeddeloh | G06F 13/1621 710/5 |
| 8,751,725 | B1* | 6/2014 | Gangadharan | G06F 12/0638 711/158 |
| 8,943,164 | B2* | 1/2015 | Kies | H04L 67/2828 709/219 |
| 9,692,560 | B1* | 6/2017 | Galon | H04L 1/1628 |
| 9,710,386 | B1* | 7/2017 | Zhang | G06F 9/5016 |
| 10,108,374 | B2* | 10/2018 | Singh | G06F 3/061 |
| 10,545,672 | B2* | 1/2020 | Cui | G06F 13/1689 |
| 2004/0133713 | A1* | 7/2004 | Elzur | H04L 47/34 710/52 |

(Continued)

OTHER PUBLICATIONS

United Kingdom Search Report dated Apr. 18, 2019 for GB Application No. 1817804.6.

*Primary Examiner* — Abu Zar Ghaffari
(74) *Attorney, Agent, or Firm* — EIP US LLP

(57) ABSTRACT

A method of requesting data items from storage. The method comprising allocating each of a plurality of memory controllers a unique identifier and assigning memory transaction requests for accessing data items to a memory controller according to the unique identifiers. The data items are spatially local to one another in storage. The data items are requested from the storage via the memory controllers according to the memory transaction requests and then buffered if the data items are received out of order relative to an order in which the data items are requested.

10 Claims, 3 Drawing Sheets

(56) References Cited

U.S. PATENT DOCUMENTS

| | | | |
|---|---|---|---|
| 2008/0183953 A1* | 7/2008 | Flynn | G06F 13/426 |
| | | | 711/103 |
| 2011/0029732 A1* | 2/2011 | Kobayashi | G06F 3/061 |
| | | | 711/E12.001 |
| 2011/0296129 A1* | 12/2011 | Arai | G11C 7/10 |
| | | | 711/165 |
| 2012/0005396 A1* | 1/2012 | Sargeant | G06F 13/1684 |
| | | | 710/316 |
| 2015/0234605 A1* | 8/2015 | Nagata | G06F 13/1642 |
| | | | 710/5 |
| 2016/0231961 A1* | 8/2016 | Shin | G06F 3/0673 |
| 2017/0186332 A1* | 6/2017 | Ichikawa | G09B 7/02 |
| 2017/0286151 A1* | 10/2017 | Landers | G06F 13/1605 |
| 2017/0329710 A1* | 11/2017 | Krause | G06F 13/1673 |
| 2017/0371565 A1* | 12/2017 | Liu | G06F 3/064 |
| 2018/0091534 A1* | 3/2018 | Dubrovsky | H04L 47/2433 |
| 2018/0165205 A1* | 6/2018 | Sasanka | G06F 12/128 |
| 2018/0189234 A1* | 7/2018 | Nurvitadhi | G06F 9/30036 |
| 2018/0203735 A1* | 7/2018 | Ash | G06F 12/0806 |
| 2019/0164615 A1* | 5/2019 | Kim | G06F 3/0659 |
| 2019/0188164 A1* | 6/2019 | Avrukin | G06F 12/0875 |
| 2020/0104195 A1* | 4/2020 | Sanghi | G06F 9/544 |

\* cited by examiner

MEMORY TRANSACTION REQUEST MANAGEMENT FOR AN ORDERED UNIT OF DATA ITEMS

CROSS-REFERENCE TO RELATED APPLICATIONS

This application claims the benefit under 35 U.S.C. § 119(a) and 37 CFR § 1.55 to United Kingdom patent application no. GB 1817804.6 filed on Oct. 31, 2018 the entire content of which is incorporated herein by reference.

BACKGROUND OF THE INVENTION

Field of the Invention

The present invention relates to the management of memory transactions so as to minimize the buffer area required when data items are received from storage out of order.

Description of the Related Technology

The reordering of memory transaction requests enables higher performance of the respective components of a system. For example, a master may request data items from storage, using a memory transaction request, each memory transaction request may be allocated a unique identifier, so they may be provided to the dynamic memory controllers (DMC) so that the associated data item may be requested from storage. However, by allocating each memory transaction request an identifier, the master must be able to handle situations whereby the data items are received out of order. Therefore, the master has a buffer capable of temporarily storing data items that are received out of order. The buffer must be large enough to store all transactions that have been allocated a unique identifier as there is no way to determine which data item will be received first, and in a worst-case scenario, every data item may be fetched prior to the first data item being fetched.

SUMMARY

According to a first aspect of the present disclosure, there is provided a method of requesting data items from storage, the method comprising: allocating each of a plurality of memory controllers a unique identifier; assigning memory transaction requests for accessing data items to a memory controller according to the unique identifiers, wherein the data items are spatially local to one another in storage; requesting the data items from the storage via the memory controllers according to the memory transaction requests; and buffering the requested data items if the data items are received out of order relative to an order in which the data items are requested.

According to a second aspect of the present disclosure, there is provided a processor comprising an allocation module for allocating each of a plurality of memory controllers a unique identifier; an assignment module for assigning memory transaction requests issued by the processor to one of the memory controllers according to the unique identifier allocated to the memory controller, wherein the memory transaction requests each represent a request for a respective data item in a plurality of data items that are spatially local to one another in storage; and a buffer for storing data item requested by the memory controllers if the data items are received out of order relative to an order in which the data items are requested.

According to a third aspect of the present disclosure, there is provided a transaction management system comprising storage; a plurality of memory controllers arranged to access the storage; and a processor for allocating memory transaction requests to each of the plurality of memory controllers for data items that are spatially local to one another in the storage.

According to a fourth aspect of the present disclosure, there is provided a non-transitory computer readable storage medium comprising a set of computer-readable instructions stored thereon which, when executed by at least one processor, cause the at least one processor to: allocate each of a plurality of memory controllers a unique identifier; assign memory transaction requests for accessing data items to a memory controller according to the unique identifiers, wherein the data items are spatially local to one another in storage; request the data items from the storage via the memory controllers according to the memory transaction requests; and buffer the requested data items if the data items are received out of order relative to an order in which the data items are requested.

BRIEF DESCRIPTION OF THE DRAWINGS

Further features and advantages of the invention will become apparent from the following description, given by way of example only, which is made with reference to the accompanying drawings in which like reference numerals are used to denote like features.

DETAILED DESCRIPTION OF CERTAIN INVENTIVE EMBODIMENTS

Figure 1:
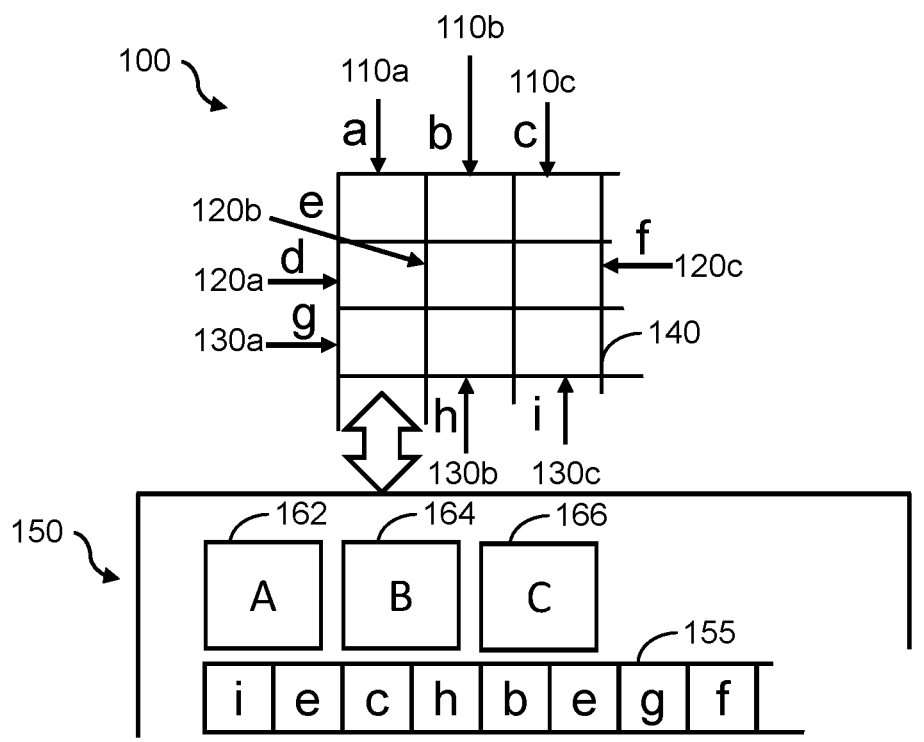
FIG. 1 shows schematically a storage medium and processor of the prior art.

Details of systems and methods according to examples will become apparent from the following description with reference to the Figures. In this description, for the purposes of explanation, numerous specific details of certain examples are set forth. Reference in the specification to 'an example' or similar language means that a feature, structure, or characteristic described in connection with the example is included in at least that one example but not necessarily in other examples. It should be further noted that certain examples are described schematically with certain feature omitted and/or necessarily simplified for the ease of explanation and understanding of the concepts underlying the examples.

In some storage systems, a technique of data striping may be used, in particular for large data items, whereby consecutive segments of the data item are stored on different storage devices, or in some embodiments in different areas of a single storage device. Striping may be useful when a processor requests data more quickly than a single storage device can provide it. By spreading segments across multiple storage devices which can be accessed concurrently, the total data throughput is increased. Data striping is commonly used across storage devices in redundant array of independent disks (RAID) storage, network interface controllers, different devices in clustered file systems and grip-oriented storage, and more commonly in the random-access memory of some systems.

Whilst data striping has the ability to improve performance and throughput, the miss management of data requests can result in inefficiencies. For example, a system comprising two storage devices may separate data into 4 stripes and use multiple memory controllers to increase the speed by which the data items are read. It will be appreciated that a system may have at least two memory controllers. For example, a fourth stripe may be allocated to a first memory controller, and the first through third stripes may be allocated to a second memory controller, this results in the first memory controller being idle whilst the first through third stripes are read via the second memory controller, only once the stripes of the second memory controller have been fetched may the first memory controller fetch the first stripe. Therefore, any efficiency that would be potentially gained by separating the data across different storage devices has been lost. Furthermore, as a result, the second through fourth stripes are unable to be processed, and as such, they are required to be stored in a buffer. This buffer must be sized sufficiently, such that all stripes data are capable of being stored, so as to cater for the worst-case scenario whereby the first data item is the last to be fetched from storage.

To avoid this, the transactions requests may be rearranged, such that data items, or stripes, are read to the storage in the most efficient manner. This ensures that the efficiencies gained by separating the data item across multiple storage devices are maximized.

FIG. 1 shows schematically a storage medium 100 of the prior art, comprising a number of data items, such as 140, and a number of memory transaction requests as represented by arrows 110a, 110b, 110c, collectively 110; 120a, 120b, 120c, collectively 120; and 130a, 130b, 130c, collectively 130, for accessing each of the data items 140. FIG. 1 also shows a processor 150 with a buffer 155. Each transaction request 110, 120, 130 is issued by a master, such as a processor, and the order each data item 140 is accessed is dependent upon the order in which each transaction request 110, 120, 130 is processed by a slave, such as a dynamic memory controller (DMC) 162, 164, 166, arranged to manage access to one or more storage devices. Each memory transaction request 110, 120, 130 is provided with a unique identifier (a . . . i) by the master, and allocated to a DMC 162, 164, 166.

The order that memory transaction requests 120, 130 140 may be allocated to a particular DMC may be carefully managed. For example, to avoid inefficiencies, it is desirable to avoid having a first DMC read a data item, for example via transaction request 110a, and then subsequently read a data item via transaction request 120a. As these data items exist in different rows of the memory, or in some embodiments may exist in a different storage device entirely. This leads to inefficiencies and an increase in power consumption because it is necessary for the DMC to open and close multiple rows in the storage 100 at a time. Therefore, it is beneficial for a DMC to issue reads for all data items 140 in a single row of memory 100 at the same time, instead of opening one row and then closing that row without reading all the data items within to access another row.

When reading data items (a . . . i) from memory, if the data items are requested out of order, for example, a memory controller receives a memory transaction request (i.e. memory transaction request 130c), the data item i read by the processor 150, will be unable to be processed. Therefore, the data item i must be stored in a buffer 155, for use when it is able to be processed. In this example the data item i may only be processed once the preceding data items a . . . h have been read from memory.

As such, the buffer 155 must large enough to hold the full issuing capability of memory transaction requests 110, 120, 130. For example, if a master can issue 64, 4 beat 16 byte read transactions, the buffer 155 must be at least 4096 bytes so as to be able to hold the data items for every possible transaction request. As shown in FIG. 1, the buffer 155 is large enough to hold all memory transaction requests 110, 120, 130, this enables a processor to store data items that are read out of order. That is, the worst-case scenario is that the plurality of DMCs may read all data items except the first one, therefore the processor will be unable to process any of the data items until the first data item is read. As explained previously, this is inefficient, as it requires opening and closing of rows of storage multiple times increasing the power usage, as well as requiring a buffer having a relatively large area, capable of storing the full issuing capability of the master.

Figure 2:
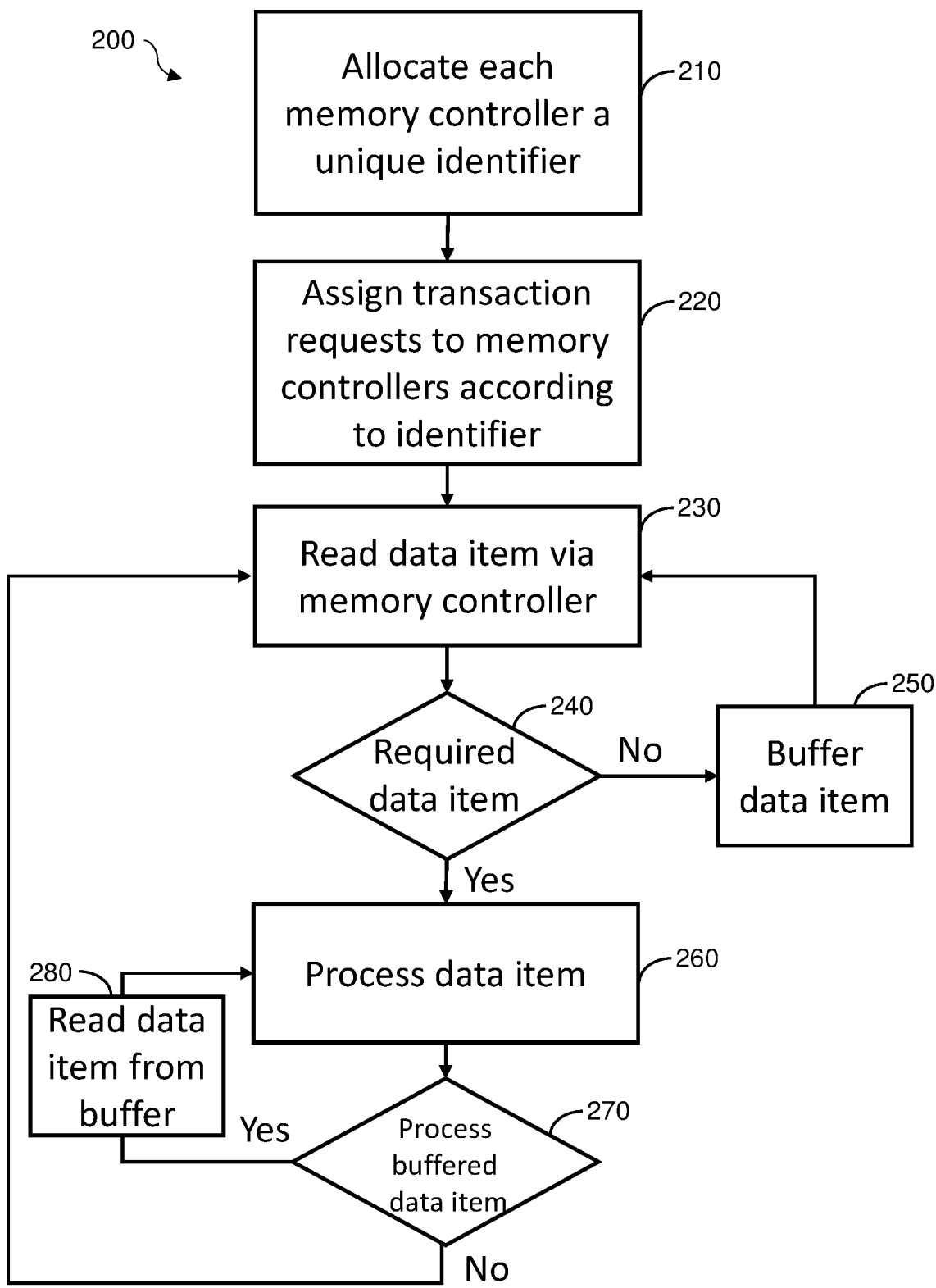
FIG. 2 is a flow diagram showing a method of managing memory transaction requests according to examples.
Figure 5:
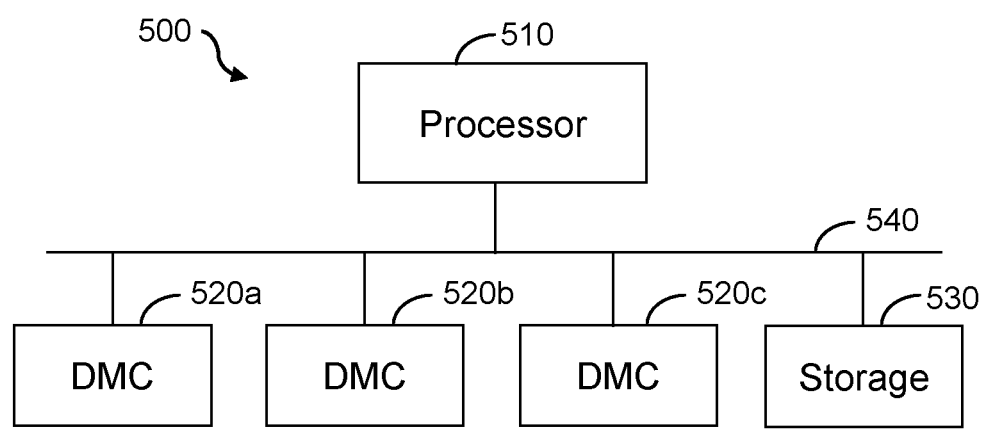
FIG. 5 shows schematically a system for managing memory transaction requests according to examples.

FIG. 2 is a flow diagram showing a method 200 of managing memory transaction requests according to an example. At item 210, the memory controllers of a system, such as system 500 described below in relation to FIG. 5 are each assigned a unique identifier. The unique identifier, as will be described below may be used to assign memory transaction requests to the memory controller.

At item 220, memory transaction requests, for requesting data items from storage, may be assigned to each memory controller. The memory transaction requests may represent a request for a plurality of spatially local data items. Data items that are spatial local to one another are stored within relatively close storage locations. More particularly, if a particular storage location is referenced at a particular time, then it is likely that nearby storage locations will be referenced in the near future. These other storage locations are said to be spatially local. Data items may, for example, have substantially sequential memory addresses, such as being from a particular row of dynamic random access memory. This may be the case when the master is a machine learning accelerator, or any other processor arranged to issue memory transaction requests for spatially local data items. Since the transaction requests represent spatially local data items any reordering of the transaction requests to minimize the number of open/closes of a particular row of dynamic random access memory would be unlikely to result in an increase in efficiency.

At item 230, the memory controller fetches the data items from storage according to the memory transaction request. As mentioned above, as the memory transaction requests represent a request for a spatially local data items, therefore the data items have substantially similar memory access addresses. Accordingly, the memory transaction requests may request data items from a particular row of memory. In some embodiments, the memory transaction requests may represent transactions whereby all data items of a particular row may be read before the row is closed and a second row is opened, this helps to ensure the most efficient way of managing the data, and also reduces power consumption since the number of times a particular row of memory is required to be opened and/or closed is reduced.

At item 240, it is determined whether the data item fetched by the memory controller is the required data item. For example, it may be determined whether the data item the first data item of a particular unit comprising a plurality of data items. If so, then the data item is processed at item 260, if not then the data item is buffered at item 250.

Once the data item is buffered at item 250, the method 200 returns to item 230, where the next data item is fetched. Item 240 is then repeated, and it is determined whether the data item is the required data item. If so, the method progresses to item 260 where the data item is processed, if not, the data item is added to the buffer at item 250. Steps 230, 240, 250 repeat until all data items that have been assigned to the memory controllers have been processed.

Once a data item has been processed at item 260, for example, because it is the first data item of a particular unit, the method 200 progresses to item 270, where it is determined whether a buffered data item may be processed. For example, after processing the first data item of a particular unit, if the second data item of that unit has been buffered, this may now be read from the buffer at item 280 and processed at item 260. If the method 200 is unable to process a buffered item, the method loops back to item 230, where the next data item is fetched via the memory controller.

As each memory transaction request is allocated to a particular memory controller, and the memory transaction requests represent requests for spatially local data items, the buffer size required is substantially smaller than the buffer size described above in relation to FIG. 1. The size of the buffer may, in some examples, be calculated using the following formula:

$$\left(\frac{\text{issuing capability} \times \text{transaction size}}{\text{number of memory controllers}}\right) \times$$

(number of memory controllers − 1)

For example, if a processor, is capable of issuing 12, 4 beat, 16 byte read transactions across 3 memory controllers, a system need only allocate three unique identifiers, one for each memory controller. As such, the buffer need only be 512 bytes ((12 transactions×4 beats×16 bytes)/3×2), and as the processor issues transaction requests for data having substantially sequential memory access addresses, there is unlikely to be any performance degradation when compared to the system/method described previously with reference to FIG. 1. This compares to a buffer size of 768 bytes (12 transactions×4 beats×16 bytes) where each data item is allocated a unique identifier.

Figure 3:
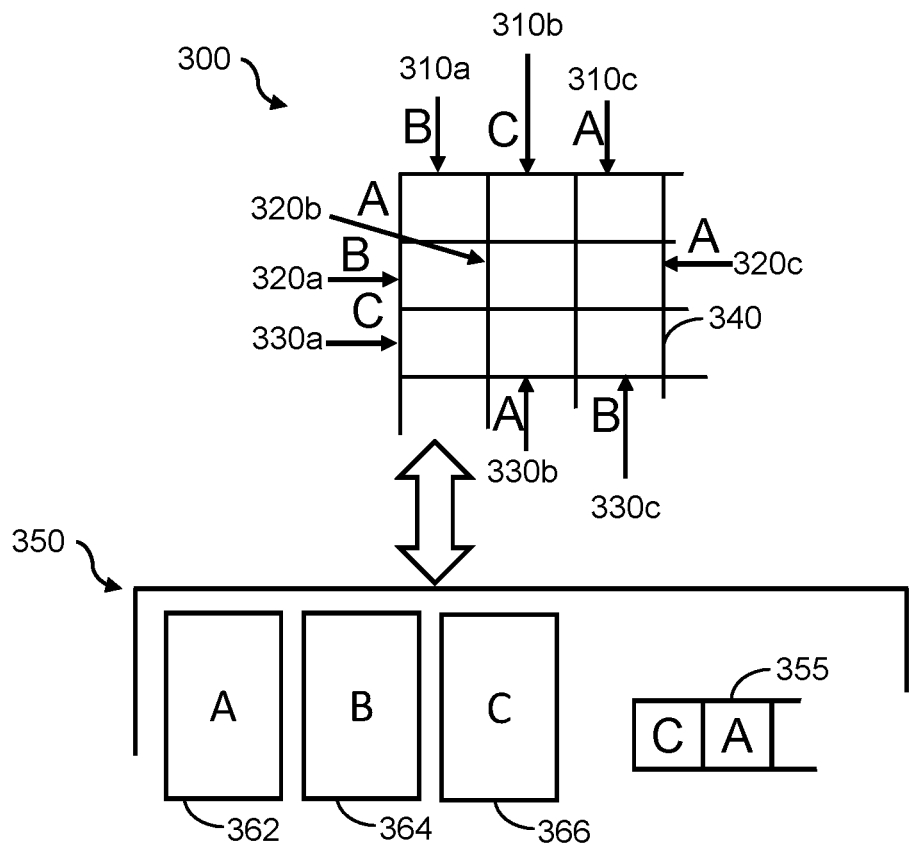
FIG. 3 shows schematically a storage medium and processor for managing memory transaction requests according to examples.

FIG. 3 shows a storage medium 300 and a number of memory transaction requests as represented by arrows 310a, 310b, 310c, collectively 310; 320a, 320b, 320c, collectively 320; and 330a, 330b, 330c, collectively 330, for accessing each of the data items 340. FIG. 1 also shows a master 350 with a buffer 355, and three memory controllers 362, 364, 366.

The master 350 may be a processor such as a machine learning processor, which issues sequential transactions. In the example shown in FIG. 3, there are three memory controllers 362, 364, 366, however, it will be appreciated that there may be two or more memory controllers. The master 350 also comprises a buffer 355 for buffering data items received out of order. It will be appreciated that the memory controllers 362, 364, 366 and buffer 355, whilst shown as part of the master 350 may be separate components, or form part of a separate component of a system, such as a memory access unit.

As described above, in relation to FIG. 2, each of the memory transaction requests 310, 320, 330 may be allocated to one of the three memory controllers 362, 364, 366. For example, as shown in FIG. 3, memory transaction request 310a has been allocated to memory controller B 364, memory transaction request 310b has been allocated to memory controller C 366 and memory transaction request 310c has been allocated to memory controller A 362. In an example, where the memory transaction request 310b which has been allocated to memory controller C 366 is completed first, and the memory transaction request 310c which has been allocated to memory controller A 362 is completed second, the data items accessed by those transaction requests are not able to be processed by the master 350 as they have been received before the first item of that unit, which is requested by memory transaction request 310a which has been allocated to memory controller B 364.

In this situation, it is necessary to buffer the data items associated with memory transaction requests 310b and 310c. Therefore, these data items are stored in the buffer 355. Once memory controller A 362 has fetched the data item associated with memory transaction request 310a, this may be processed by the master 350 when it is received. The data items associated with the other memory transaction requests 310b, 310c may then be fetched from the buffer 350 and processed by the master 350 in order.

As mentioned previously, as the master 350 issues requests for spatially local data items having substantially sequential memory addresses, no benefit is gained from reordering the transaction requests as described above in relation to FIG. 1. Since data items will be generally requested in order, it is the memory controllers that will determine whether an item is received out of order, for example, due to a backlog at a particular memory controller, allocating each memory transaction request 310, 320, 330 to a particular memory controller 362, 364, 366 means that the size of the buffer 355 can be reduced. The number of items waiting to be processed is directly related to the number of memory controllers. For example, the worst-case scenario, if there are four memory controllers each being allocated a memory transaction requests, is that the second, third and fourth data items are received before the first data item. As such, the second, third and fourth data items need to be buffered so that they are able to be processed by the master 350 once the first data item is received. Therefore, a greater reduction in the size of the buffer may be achieved with a lower number of memory controllers. That is if there are two memory controllers the buffer size may be halved in comparison to the buffer 155 described above in relation to FIG. 1, if there are three memory controllers, the buffer size may be two thirds the size of the buffer 155 described above in relation to FIG. 1.

As memory transaction requests 310, 320, 330 represent spatially local data items, the size of the buffer may, therefore, be reduced. Using the example mentioned above in relation to FIG. 1, whereby a master 350, such as a machine learning processor, is capable of issuing 12, 4 beat, 16 byte memory transaction requests, by allocating identifiers to each memory controller 362, 364, 366, instead of each transaction the buffer size may be reduced to 512 bytes ((12 transactions×4 beats×16 bytes)/3×2) instead of 768 bytes (12 transactions×4 beats×15 bytes). This therefore, reduces the space required for the buffer 355 on a chip, and also reduces the cost due to a reducing in the amount of memory required.

In other embodiments, each memory controller 310, 320, 330 may be allocated multiple identifiers, and transaction requests which request spatially local data items may be issued with the same identifier of the multiple identifiers allocated to the memory controller 310, 320, 330. This ensures memory transaction requests for spatially local data items are allocated to the same memory controller, thereby ensuring the efficiencies mentioned above are maintained, and in some examples, improved given that such a scheme would minimize the number of access to data that are received out of order.

Figure 4:
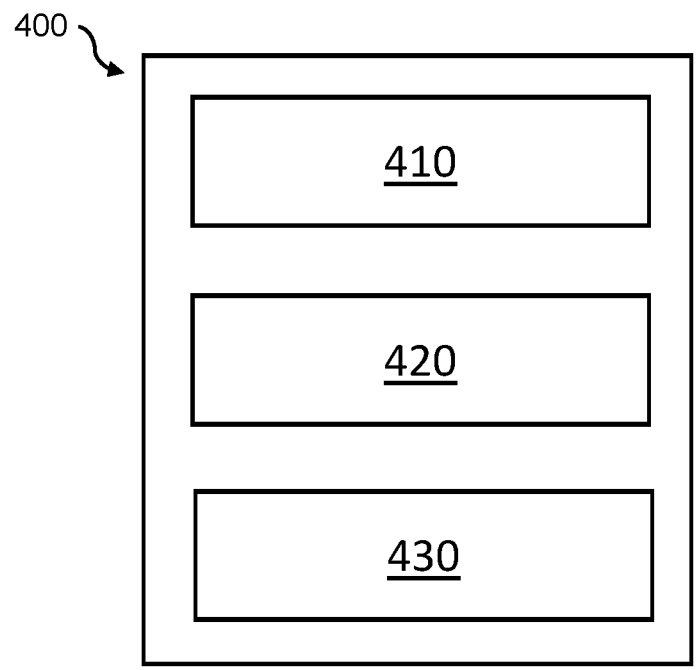
FIG. 4 shows schematically a processor for managing memory transaction requests according to examples.

FIG. 4 shows, schematically, a processor 400 for requesting data items from storage. The processor 400 comprises an allocation module 410 for allocating each of a plurality of memory controllers (not shown) a unique identifier, as mentioned above. In some embodiments the memory controllers may also form part of the processor 400 as described above in relation to FIG. 3, however, it will be appreciated that the memory controllers may not be part of the processor 400 and form part of a separate memory access unit (not shown).

The processor 400 also comprises an assignment module 420 for assigning memory transaction requests issued by the processor 400 to one of the memory controllers according to the unique identifier. That is, a memory transaction request, such as the memory transaction requests 310, 320 330 described above in relation to FIG. 3, may be allocated to one of the memory controllers, such as the memory controllers 362, 364, 366 of FIG. 3, thereby enabling the memory controllers 362, 364, 366 to access data items 340 in storage 300.

The processor 400 also comprises a buffer 430 for storing data items accessed by the memory controllers when the data items are received out of order. As described above, when memory transaction requests, such as 310, 320, 330 of FIG. 3 are allocated to memory controllers, the data items fetched by the memory transaction requests may, in some examples, be received out of order. For example, a fourth data item of a unit may be received before the first data item of the unit. As such, the processor 400 is unable to process the fourth data item until the first, second and third data item have been fetched from storage. As the processor 400 issues memory transaction requests for spatially local data items having substantially sequential memory addresses, the buffer size may be smaller than a buffer for a processor which allocates identifiers to individual memory transaction requests that are not for spatially local data items as the order data items will be received is dependent on the memory controllers. Furthermore, there is no requirement to rearrange the memory transaction requests to reduce the number of open/close operations in the storage, and more efficiently manage the data fetched from storage.

FIG. 5 shows schematically a system 500 for use with a method of managing memory transactions according to examples. The system 500 includes at least one processor which may act as a master, such as the master 350 described above in relation to FIG. 3. In this example, the system 500 may include a machine learning processor 510 which, in some embodiments, may be the processor 400 described above in relation to FIG. 4. It will be appreciated that the system may also comprise alternative and/or additional processors, such as a microprocessor, a general-purpose processor, a digital signal processor (DSP), an application specific integrated circuit (ASIC), a field programmable gate array (FPGA), neural network accelerator (NNA), neural network processor (NNP), or other programmable logic device, a discrete gate or transistor logic, discrete hardware components, or any suitable combination thereof designed to perform the functions described herein. The system 500 may also or alternatively include a processor implemented as a combination of computing devices, for example, a combination of a DSP and a microprocessor, a plurality of microprocessors, one or more microprocessors in conjunction with a DSP core, or any other such configuration. The system 500 may also or alternatively include at least one graphics processing unit (GPU). It will be appreciated that the processor, such as processor 510 which acts as the master for issuing memory transaction requests, such as 310, 320, 330 of FIG. 3, may be any processor capable of issuing memory transaction requests for spatially local data items.

When the processor 510 is a machine learning processor, the processor 510 may include a driver which, for example, provides an interface between software configured to control or configure a neural network, and which may be configured to perform the processing to implement the neural network. In other examples, the neural network may be implemented using a more general processor, such as a CPU or a GPU.

The system 500 also includes a plurality dynamic memory controllers (DMC) 520a, 520b, 520c which may be used to control access to storage 530 of the system 500 according to the method 200 described above in relation to FIG. 2. The storage 530 is, for example, external to the machine learning processor 510 and may be a random-access memory (RAM) such as DDR-SDRAM (double data rate synchronous dynamic random-access memory). In other examples, the storage 530 may be or include a non-volatile memory such as Read Only Memory (ROM) or a solid-state drive (SSD) such as Flash memory. The storage 530 in examples may include further storage devices, for example magnetic, optical or tape media, compact disc (CD), digital versatile disc (DVD) or other data storage media. The storage 530 may be removable or non-removable from the system 500.

The DMCs 520a, 520b, 520c may be external to the processor 510 as depicted in FIG. 5, or alternatively, the DMCs 520a, 520b, 520c may form part of the processor, as shown in FIG. 3. In some embodiments, the DMCs 520a, 520b, 520c may form part of a memory access unit which may be external to the processor 510. In further embodiments, it will be appreciated that the system 500 may comprise DMCs 520a, 520b, 520c, some which form part of the processor 510 and some which are external to the processor 510.

The components of the system 500 in the example of FIG. 5 are interconnected using a systems bus 540. This allows data to be transferred between the various components. The bus 540 may be or include any suitable interface or bus. For example, an ARM® Advanced Microcontroller Bus Architecture (AMBA®) interface, such as the Advanced eXtensible Interface (AXI), may be used.

The order of processing steps in the examples described above are merely examples. In other examples, these processing steps may be performed in a different order.

It is to be understood that any feature described in relation to any one example may be used alone, or in combination with other features described, and may also be used in combination with one or more features of any other examples, or any combination of any other examples. Furthermore, equivalents and modifications not described above may also be employed without departing from the scope of the accompanying claims.

What is claimed is:

1. A method of requesting a plurality of data items from storage, the data items being requested in a given order, the given order being based on memory addresses associated with each of the data items in the storage, the method comprising:

allocating each of a plurality of memory controllers a unique identifier;

assigning memory transaction requests for accessing the data items to a memory controller according to the unique identifiers, wherein each data item associated with the memory transactions requests has a sequential memory address in the storage;

requesting the data items from the storage via the memory controllers according to the memory transaction requests;

receiving the requested data items from the storage via the memory controllers;

determining whether a data item of the received data items is the next data item in the given order;

processing the data item of the received data items, if it is determined that the received data item is the next data item in the given order based on the associated memory addresses, and buffering the data item of the received data items, if the received data item is not the next data item in the given order based on the associated memory addresses.

2. The method of requesting the data items from the storage according to claim 1, wherein the storage is any of random-access memory, dynamic-random access memory, or non-volatile memory.

3. The method of requesting the data items from the storage according to claim 1, wherein the memory controllers are dynamic memory access controllers.

4. A processor comprising:
an allocation module for allocating each of a plurality of memory controllers a unique identifier;
an assignment module for assigning memory transaction requests issued by the processor to one of the memory controllers according to the unique identifier allocated to the memory controller, wherein the memory transaction requests each represent a request for a respective data item from storage, wherein the data items associated with the memory transaction requests are requested in a given order, the given order being based on memory addresses associated with each of the data items in the storage, and have sequential memory access addresses in the storage;
a determination module for determining whether a data item corresponding to a requested data item received via at least one of the memory controllers, is a next data item in the given order;
a processing module for processing the received data item, if it is determined that the requested data item is the next data item in the ordered unit of data items based on the associated memory addresses; and
a buffer for storing the requested data item if the received data item is not the next data item in the ordered unit of data items based on the associated memory addresses.

5. The processor of claim 4, wherein the storage is any of random-access memory, dynamic-random access memory, or non-volatile memory.

6. The processor of claim 4, wherein the memory controllers are dynamic memory access controllers.

7. The processor of claim 4, wherein the processor is a machine learning processor.

8. A transaction management system comprising:
storage;
a plurality of memory controllers arranged to access the storage; and
a processor according to claim 4.

9. The transaction management system of claim 8, wherein the storage is any of random-access memory, dynamic-random access memory, or non-volatile memory.

10. The transaction management system of claim 8, wherein the memory controllers are dynamic memory access controllers.

* * * * *